United States Patent

[11] 3,564,112

| [72] | Inventors | Sven Erik Algotsson;<br>Sune Hugo Ivan Lorentzon, Gavle, Sweden |
|---|---|---|
| [21] | Appl. No. | 804,228 |
| [22] | Filed | Mar. 4, 1969 |
| [45] | Patented | Feb. 16, 1971 |
| [73] | Assignee | A B Elektroverken i Gavle<br>Gavle, Sweden |
| [32] | Priority | Mar. 6, 1968 |
| [33] | | Sweden |
| [31] | | 2952/68 |

[54] BOX FOR ENCLOSURE OF ELECTRICAL EQUIPMENT
8 Claims, 5 Drawing Figs.

[52] U.S. Cl. ..................................................... 174/52;
317/117; 220/3.92
[51] Int. Cl. ...................................................... H05k 5/00
[50] Field of Search........................................... 174/50, 52;
220/3.92, 3.94, 4; 317/117

[56] References Cited
UNITED STATES PATENTS

| 1,205,589 | 11/1916 | Young | 220/3.92 |
|---|---|---|---|
| 1,541,485 | 6/1925 | Dennis | 220/3.92 |
| 1,654,225 | 12/1927 | Tanner | 220/4UX |
| 1,817,307 | 8/1931 | Haase et al. | 220/3.94 |
| 1,883,553 | 10/1932 | Chain | 220/4 |
| 2,919,045 | 12/1959 | Waugh et al. | 220/4 |
| 3,093,259 | 6/1963 | Morrison | 220/4X |
| 3,234,908 | 2/1966 | Doskocil | 220/4X |
| 3,315,834 | 4/1967 | Nemlich | 220/4 |
| 3,327,882 | 6/1967 | Andrews | 220/4 |
| 3,405,835 | 10/1968 | Eby | 220/4 |
| 3,410,441 | 11/1968 | Rhyne | 220/4 |

Primary Examiner—Lewis H. Myers
Assistant Examiner—D. A. Tone
Attorney—Sughrue, Rothwell, Mion, Zinn and MacPeak

ABSTRACT: Box for enclosure of electrical equipment which is formed of sidewalls manufactured as separate elements by precision casting and of a bottom, each of which parts is sealed by a bonding agent with the adjoining sidewalls through engaging devices in the edges of the sidewalls.

BOX FOR ENCLOSURE OF ELECTRICAL EQUIPMENT

The invention relates to boxes for enclosure of electrical equipment e.g. for use in electrical distribution equipment.

Bus bars and electrical apparatus such as circuit breakers, fuses, measuring instruments etc. are often combined to form a distribution board in which the various units are enclosed in boxes etc. for protection against touch, mechanical damage, damp, dirt, gases etc. Such boxes must effectively protect the enclosed electrical equipment against the ambience, at the same time as the equipment must be readily accessible for repair and maintenance. It is, of course, also desirable that the boxes are aesthetically attractive.

Boxes for enclosure of electrical equipment are usually made in the form of castings, but they are sometimes made of deep drawn plate, being made as a unit in both cases. Ordinary casting methods, such as sand casting, give neither good surface finish nor any great dimensional accuracy, for which reasons some known boxes are made by pressure die casting. This procedure allows, in particular, extremely accurate dimensions, and finishing treatment is unnecessary. But pressure die-casting tools are extremely expensive, which has forced manufacturers to look for other manufacturing methods. The attempt has been made, for example, to cast the sidewalls in the form of a frame in one tool and the bottom in another, the bottom and sidewalls then being glued together. In this way the tools could be simplified and their cost somewhat reduced.

Other problems which must be taken into account in the production of boxes for enclosure of electrical equipment are associated with space requirements. The spaces in which distribution boards and the like are located are generally quite small, for which reason a large number of electrical units must be led within a limited space. It is therefore very important that the space occupied by each box can be effectively utilized, so that dead space is eliminated.

In one or more of the sidewalls, moreover, there must be openings for the introduction of electrical leads into the box. It is desirable that such openings can be extended over virtually the whole length of the sidewall to facilitate wiring both inside and outside the box. When the boxes are made by deep drawing of plate, the corners become rounded, which limits the means for punching lead-in holes extending over the entire length of a sidewall and sufficiently close to the bottom edge.

Additional problems which must be taken into account in the manufacture of said boxes relate to the large assortment of electrical equipment for which enclosure may be required. It is therefore necessary to manufacture a large number of boxes of different shapes and sizes. This means that a large number of expensive tools are needed for the manufacture, and large space for storage of the boxes.

The present invention is intended primarily to eliminate the drawbacks associated with the production of boxes for electrical equipment and at the same time to permit the manufacture of such boxes at heavily reduced costs. The box according to the invention is characterized in that it is formed of sidewalls made as separate elements by precision casting or compression moulding, and of a bottom, possibly also cast, each of which parts, by means of engaging devices arranged in the edges of the sidewalls, and possibly of the bottom, are in engagement preferably secured and/or sealed by means of a bonding agent, with adjacent sidewalls.

According to an advantageous further development of the invention the engaging devices in the sidewalls, for engagement with the adjacent sidewalls, consist of ribs alternating with cutouts, the ribs and cutouts in one edge of the sidewalls being mainly perpendicular to the plane of the sidewalls, and the ribs and cutouts in the opposite edge being mainly parallel with the plane of the sidewalls. The engaging devices in the sidewalls for the bottom of the box, preferably consisting of a rectangular plate, consist preferably of a, possibly, intermittent slot.

In order to increase the area of contact between the sidewalls, and so increase the strength of the complete box, the sidewalls according to the invention are provided at their edges remote from the bottom with front strips extending along these edges, the width of the strips considerably exceeding the thickness of the sidewalls. These front strips are stepped at the corners of the sidewalls, whereby two strips meeting one another at a corner engage in one another along a stepped curve.

The gain according to the invention is thus that tools for the manufacture of boxes for the enclosure of electrical equipment are considerably simplified compared with tools for the manufacture of known boxes of conventional type. If a series of boxes of different sizes are manufactured on a modular system, a tool used for the manufacture of a large sidewall in a box of given size can be used for manufacture of a small sidewall in a box of next larger size. This reduces the tool costs still further. The invention also enables the bottom of the box to be made of plate, which reduces the production costs considerably more.

For the mounting of electrical apparatus in the boxes, and for the suspension of the boxes on a wall or the like, the sidewalls are provided along the bottom edge with cutouts arranged on a suitable modular system. In these cutouts fastening elements can be inserted in conjunction with the fitting together of the four sidewalls and a bottom plate to form a box in manner described below. The fastening elements accordingly need not be screwed into the box, so eliminating the threading of holes in the box that is otherwise needed at the same time as the fastening elements can be simply and rapidly fitted. If the fastening elements are glued in the cutouts, the elements also contribute to bracing of the box. If the sidewalls are made of a light alloy, this fastening of the fastening elements implies a further advantage, as screw-threads in light alloy are very weak.

Thus, for suspension of a box on a wall or the like in conjunction with assembly of the box, fastening elements are inserted in those of the cutouts in two adjacent sidewalls which are situated nearest the corners of the box. By means of screws extending through holes in these fastening elements and in the bottom, the box is attached to flat steel bars or steel sections arranged in the wall or the like. The bottom is thereby entirely relieved of suspension stresses, as the latter are transferred via the fastening screws and elements to the sidewalls. The material for the bottom can thus be selected exclusively from the point of view of the tightness requirements of the box.

According to another advantageous development of the invention the bottom edges of the sidewalls are provided with cutouts, the bottom of which is on a plane with the outer surface of the bottom of the box, designed to take external lugs for the box, which can be secured to fastening elements inside he the box by means of screws passing through the bottom of the box. A box according to the invention can be, thus, suspended on a wall or the like by means of screws which are accessible either from inside or outside the box.

In the manufacture of large boxes the lengths of the sidewalls can on practical grounds not always be maintained within such narrow tolerances that, in the assembly of the boxes, the engaging devices come into full engagement along all side edges, i.e. that all ribs, pins or the like reach the bottom of all cutouts, holes or the like. In order nevertheless to achieve definite engagement providing the desired rigidity, it is proposed according to the invention that, in precision cast sidewalls, the ribs or pins and their cutouts, holes or slots are provided on their lateral surfaces serving for engagement, with preferably ribbed, deformable bosses.

The boxes according to the invention can be stocked dismantled, which brings a great saving in storage space. At the time of delivery sidewalls and bottom plate are fitted together, for example by glueing, to form a box, the necessary fastening elements being inserted in their intended locations in the slots in the sidewalls. The form of the gripping devices in the edges of the sidewalls allows the various elements to be sufficiently effectively held together for glueing, soldering etc. to be done without the use of fixtures.

The boxes can, of course, be assembled in such a way that cutouts for the entry of electrical leads are obtained in the desired position according to the purpose for which the box is to be used.

The closing of the boxes is done with a cover fitting into lugs on the front strips of the sidewalls. The cover is so arranged that it can be fitted to any of the sidewalls. The lugs, furthermore, can either form part of a hinge or of a lock, so providing a large number of choices of principle for the closing of the box. Safety regulations require that some boxes shall be closed in such a way that they can be opened only with a tool, while other boxes must be provided with a hinged lid which is openable with a knob or the like. The desires concerning placing of the hinge are greatly varying, and in a box according to the invention all these desires can be met. The invention will now be described with reference to the attached drawings, in which:

Figure 1:
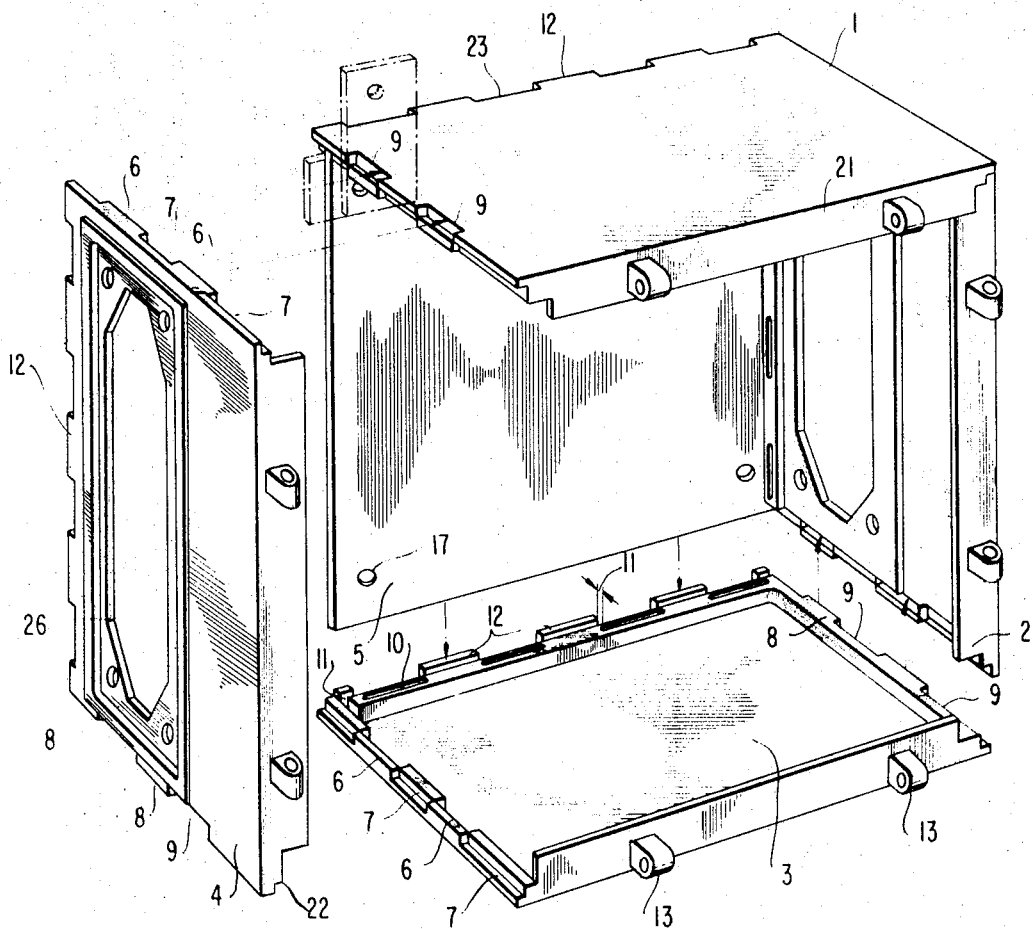
FIG. 1 shows a box according to the invention, partially assembled.

FIG. 1 shows five elements 1, 2, 3, 4, 5 which, joined together, form a box for enclosure of electrical equipment. Elements 1, 2, 3, 4 are designed to form sidewalls, which are identical in one respect, namely in the form of their edges. Thus all sidewalls have on one edge ribs 6 alternating with cutouts 7, the which ribs and cutouts are perpendicular to the plane of the sidewall. The opposing sides of the sidewalls likewise have ribs 8 and cutouts 9, the latter, however, being parallel with the plane of the sidewall.

Along their edges facing the bottom 5 of the box each sidewall 1, 2, 3, 4 has cutouts 10 and a slot 11 interrupted at regular intervals 23.

For the introduction of electrical leads into the box there are openings 26 in one or more 2, 4 of the sidewalls 1, 2, 3, 4. The sidewalls also have front strips 21 running parallel with their edges remote from the bottom 5, the strips being stepped at the corners of the sidewalls as shown at 22. On the front strips 21 are lugs 13 for fitting of a cover.

The fitting together of the various parts into a box is done as follows. On the edges of the sidewalls 1, 2, 3, 4 is applied a bonding agent, preferably a glue of epoxy resin type, at the ribs 6, 8, cutouts 7, 9, and interrupted slot 11. Two adjacent sidewalls, e.g. 1 and 2, are fitted together by bringing all ribs 6, 8 into engagement with the corresponding cutouts 7, 9. With the orientation of the sidewalls in FIG. 1, they can be fitted together only by a vertical movement of the sidewalls. The two sidewalls 1, 2 are now locked to one another in all directions except the vertical. As the sidewalls are preferentially made by pressure die casting, a very good fit is obtained, so that the two sidewalls 1, 2 are fixed fairly rigidly to one another, also in respect of rotation around their facing edges. After the sidewalls 1, 2 have been joined together in this way, the bottom plate 5 is inserted in the slot 11 in each sidewall. This provides a further reinforcement of the parts that have been joined together. Sidewalls 3, for are joined together in the same manner, after which both together are pushed from below upwards so that the bottom 5 fits into the slot 11 in the sidewall 3. The sidewalls 3 and 4 are thereby slightly displaced laterally, to the left in the FIG. In this position a suitable number of fastening elements (18) (FIG. 5) are inserted in the cutouts 10 in the edges of the sidewalls facing the bottom 5, after which the sidewalls 3 and 4 are pushed towards sidewalls 1 and 2. The sidewalls and bottom so fitted together form a box exhibiting a remarkably great rigidity even before the glue has solidified.

The fastening of the fastening elements 18 in the cutouts permits the placing of electrical apparatus in the box without subjecting the bottom to strain.

Figure 2:
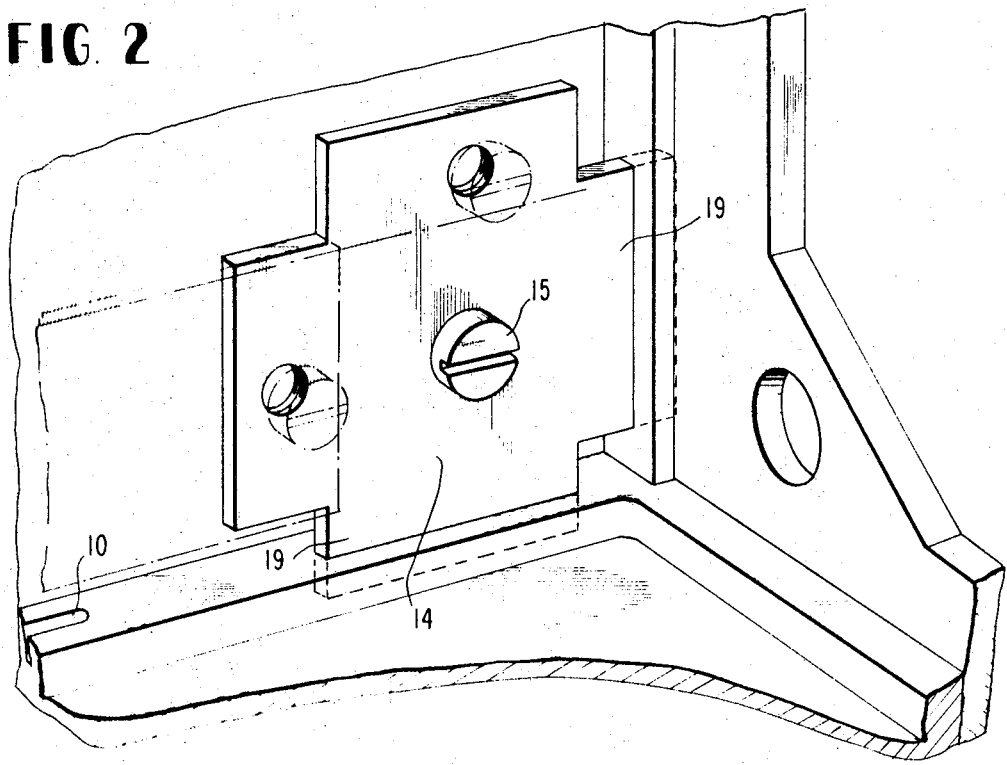
FIG. 2 shows an inside corner of an assembled box.

FIG. 2 shows a fastening element 14 having guides 19. During assembly of the box the guides 19 are inserted in the sidewall cutouts 10 situated close to the corners of the box. Fastening element 14 serves primarily to relieve the bottom from strain when the box is suspended, but also contributes to reinforcement of the corners. Thus in the fastening element 14 there is a hole, the position of which after fitting of the fastening element into cutouts 10, corresponds to holes 17 in the bottom 5. By means of a screw 15 passing through both these holes the four bottom corners of the box can be screwed to a flat steel bar or steel section erected for the purpose, for example on a wall. These bars or sections are in width and mutual spacing adapted to the cutouts 23 which cause interruptions in the walls of the slot 11, whereby projections 12 are formed. In this way the box will lie flush with the wall on which it is suspended.

Figure 3:
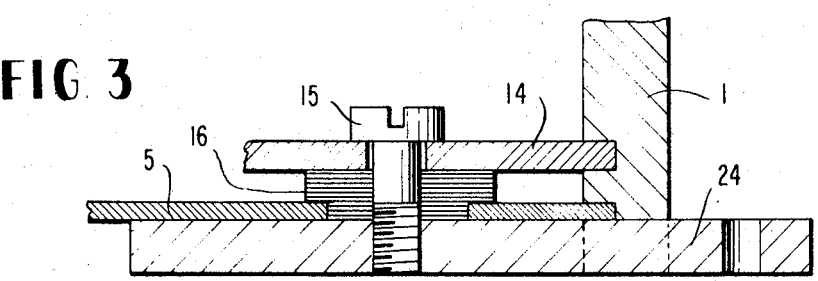
FIG. 3 shows a device for fastening of an external lug.
Figure 4:
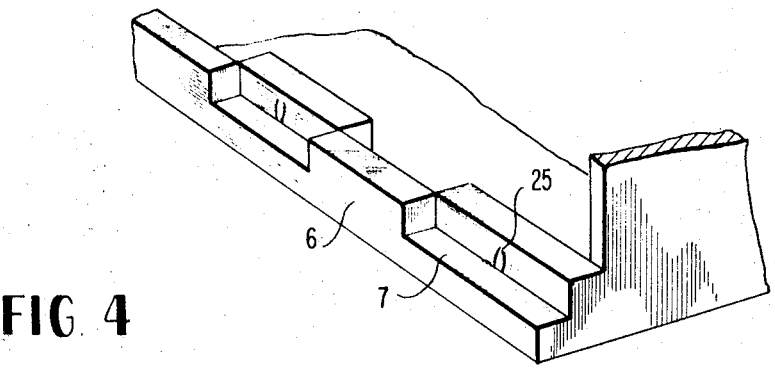
FIG. 4 shows a device for stiffening of joints.

FIG. 3 shows how the fastening elements 14 can be used for attachment of external lugs 24. These lugs have the same form as a set-square with equally thick shanks and thus consist of two shanks corresponding to the blades at an angle of 90° to one another. The shanks, which differ in length, are pressed into the cutouts 23 close to the corners of the box and the lugs are screwed to the fastening elements 14 by means of screws 15 in the latter. The lengths of the shanks are so chosen that the end of one shank lies on the plane of the outermost surface of a sidewall 1, 2, 3, 4, while the other projects out sufficiently far to take a fastening screw. The sealing of the screw-hole through the bottom is done with packings 16. FIG. 4 shows an arrangement in two of the cutouts in the sidewalls designed to increase the grip between cutouts 7, 9 and ribs 6, 8 on assembly of the box, consisting of a ribbed boss 25. The latter is deformed on assembly of the box and provides an increased grip between cutouts 7, 9 and ribs 6, 8 even if it has not been possible, owing to differences of length of the sidewalls, to push ribs 6, 8 fully into cutouts 7, 9. Such bosses can, of course, be arranged in any desired number of cutouts 7, 9, and also in the interrupted slots 11 in the sidewalls 1, 2, 3, 4.

Figure 5:
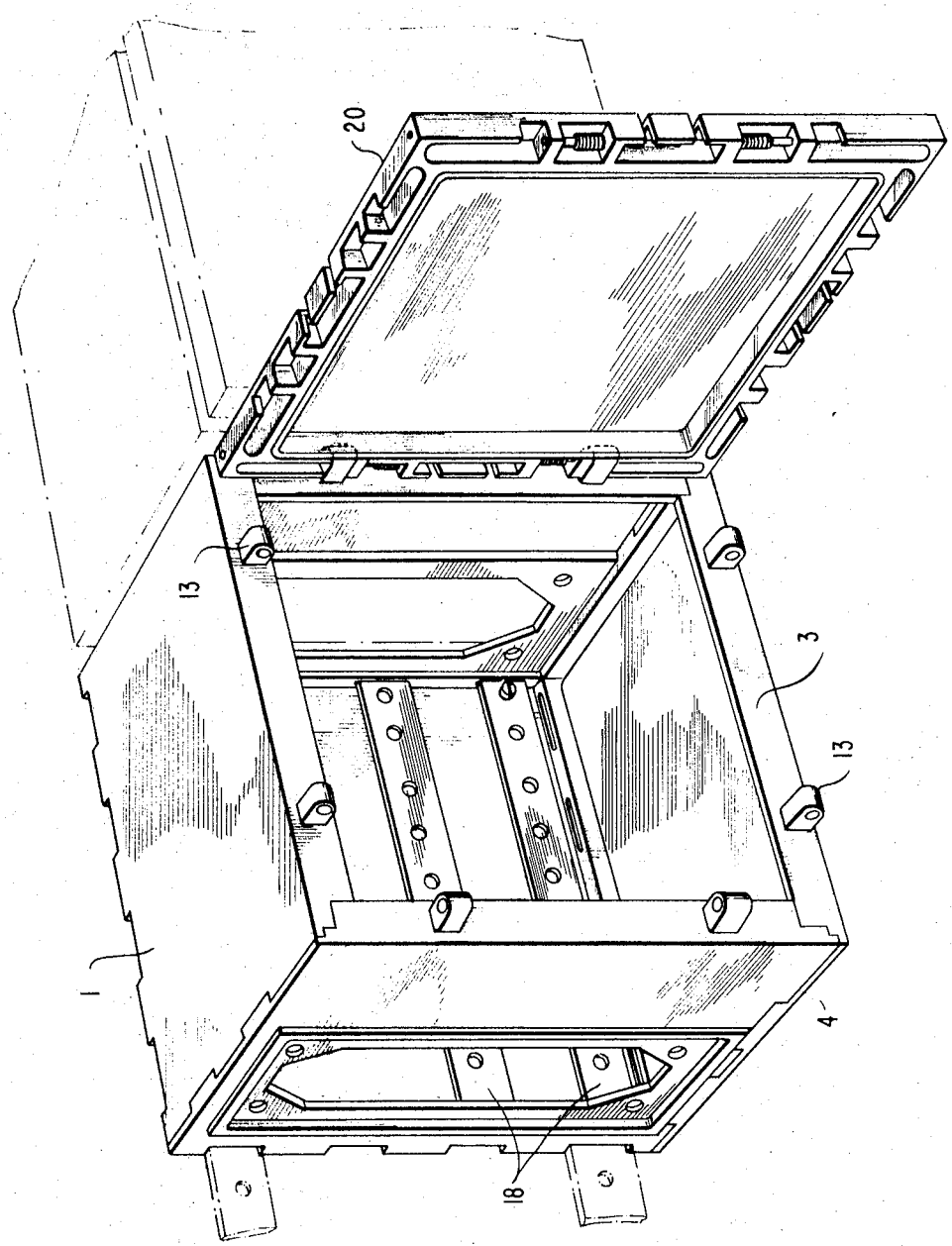
FIG. 5 shows a fully assembled box with lid.

FIG. 5 shows an assembled box according to the invention, with a cover 20. In the lugs 13 on the edges of the sidewalls 1, 2, 3, 4 remote from the bottom 5 the cover 20 can be suspended so as to swing around a shaft at any of the four sides of the cover. Bolts can also be arranged for engagement in any one or more of the lugs 13 not forming part of a hinge; alternatively these bolts may be made to be operated with a handle or merely with a tool. In this way different desires concerning closure of the box can be satisfied.

Although the invention has been described in connection with one embodiment thereof, it can be varied as desired within the scope of the following claims.

We claim:

1. A box for enclosure of electrical equipment, comprising sidewalls and a bottom, manufactured as separate elements by precision casting, each of which parts is in engagement with the adjoining sidewalls by engaging devices in the edges of the sidewalls, in which the engaging devices in each sidewall for engagement with an adjoining sidewall are essentially perpendicular to the plane of the sidewall and the engaging devices in the opposite edge of the sidewall are essentially parallel with said plane, the engaging devices consisting of parallel rows extending side by side along the entire edges of the sidewalls, each one of the rows being formed of elongated ribs interrupted by cutouts, the ribs in each row being positioned adjacent to the cutouts in an adjoining row.

2. A box according to claim 1, in which the engaging devices in the sidewalls for engaging the bottom of the box comprise an interrupted slot.

3. A box according to claim 1 in which the ribs and cutouts have deformable bosses on their lateral surfaces for reinforcing the engagement.

4. A box according to claim 1, in which the bottom edges of the sidewalls are provided with cutouts, the bottom of which are parallel to the plane at the outer surface of the bottom of the box, for accommodating external lugs for the box which can be fastened to the bottom of the box by means of screws.

5. A box according to claim 1 in which the sidewalls are provided with cutouts for accommodating fastening elements, and designed for mounting of electrical equipment in the enclosed box and for suspension of the box by means of an internal fastening screw.

6. A box according to claim 1, in which each of the sidewalls has at its edge remote from the bottom a front strip which has a stepped form at the corners of the sidewalls.

7. A box according to claim 1, in which the sidewalls formed as separate elements are sized for adaption to a modular system, whereby a large sidewall in a box of a given size coincides with a smaller sidewall in the next larger size of box.

8. A box according to claim 1, in which the front edges of the sidewalls have lugs for fitting of a cover.